(12) United States Patent
Kasagi

(10) Patent No.: US 11,782,708 B2
(45) Date of Patent: Oct. 10, 2023

(54) ARITHMETIC PROCESSING DEVICE AND ARITHMETIC PROCESSING METHOD

(71) Applicant: FUJITSU LIMITED, Kawasaki (JP)

(72) Inventor: Akihiko Kasagi, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 17/729,025

(22) Filed: Apr. 26, 2022

(65) Prior Publication Data

US 2023/0010536 A1 Jan. 12, 2023

(30) Foreign Application Priority Data

Jul. 7, 2021 (JP) ................. 2021-112534

(51) Int. Cl.
*G06F 9/30* (2018.01)
*G06F 9/38* (2018.01)
*G06F 9/4401* (2018.01)

(52) U.S. Cl.
CPC .......... *G06F 9/3001* (2013.01); *G06F 9/3826* (2013.01); *G06F 9/4411* (2013.01)

(58) Field of Classification Search
CPC .... G06F 9/3001; G06F 9/3826; G06F 9/4411; G06F 9/3869
See application file for complete search history.

(56) References Cited

U.S. PATENT DOCUMENTS

| | | | | |
|---|---|---|---|---|
| 5,928,389 A | * | 7/1999 | Jevtic | H01L 21/67745 29/25.01 |
| 2005/0050552 A1 | * | 3/2005 | Fuller | H04L 47/6255 719/321 |
| 2007/0226694 A1 | * | 9/2007 | Neufeld | G06F 21/57 717/126 |
| 2008/0049031 A1 | * | 2/2008 | Liao | G06T 15/005 345/530 |
| 2008/0184244 A1 | * | 7/2008 | Shankar | G06F 9/505 718/102 |
| 2011/0228293 A1 | * | 9/2011 | Kimura | G06F 3/1215 358/1.9 |
| 2017/0090930 A1 | * | 3/2017 | Priyadarshi | G06F 9/3814 |
| 2019/0019121 A1 | * | 1/2019 | Kanala | G06Q 10/0637 |
| 2020/0201635 A1 | | 6/2020 | Ito | |

FOREIGN PATENT DOCUMENTS

| | | |
|---|---|---|
| JP | 2011-118589 A | 6/2011 |
| JP | 2016-091307 A | 5/2016 |
| JP | 2020-101921 A | 7/2020 |

* cited by examiner

*Primary Examiner* — Farley Abad
(74) *Attorney, Agent, or Firm* — Fujitsu Patent Center

(57) ABSTRACT

An arithmetic processing device includes: a memory; and a processor coupled to the memory and configured to: execute a plurality of data processes each of which is divided into a plurality of pipeline stages in parallel at different timings; measure a processing time of each of the plurality of pipeline stages; and set a priority of the plurality of pipeline stages in a descending order of the measured processing time.

6 Claims, 9 Drawing Sheets

ARITHMETIC PROCESSING DEVICE AND ARITHMETIC PROCESSING METHOD

CROSS-REFERENCE TO RELATED APPLICATION

This application is based upon and claims the benefit of priority of the prior Japanese Patent Application No. 2021-112534, filed on Jul. 7, 2021, the entire contents of which are incorporated herein by reference.

FIELD

The embodiments discussed herein are related to an arithmetic processing device and an arithmetic processing method.

BACKGROUND

A pipeline parallel system has been known that improves a throughput by executing a data process divided into a plurality of stages in parallel at different timings. In this type of pipeline parallel system, a load at each stage is calculated on the basis of an input of the number of executable processors, and the number of processors assigned to each stage is automatically changed.

Japanese Laid-open Patent Publication No. 2011-118589, Japanese Laid-open Patent Publication No. 2016-91307, and Japanese Laid-open Patent Publication No. 2020-101921 are disclosed as related art.

SUMMARY

According to an aspect of the embodiments, an arithmetic processing device includes: a memory; and a processor coupled to the memory and configured to: execute a plurality of data processes each of which is divided into a plurality of pipeline stages in parallel at different timings; measure a processing time of each of the plurality of pipeline stages; and set a priority of the plurality of pipeline stages in a descending order of the measured processing time.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In a case where each stage reads and writes processing data from and to a memory via a common bus, a stage that is a bottleneck is specified according to a stop status of data transfer between the stages, and a priority of a memory access by the specified stage is set to be high. In a data processing device that executes a process in response to a process request, in a case where resources for executing the processes for the plurality of process requests conflict, the resource conflict is avoided by executing the processes in order.

In a case where there is a stage having a longer processing time than other stages exists in a pipeline parallel system, data waiting for being processed is accumulated in a buffer that supplies data to the stage having a longer processing time, a throughput of the pipeline parallel system decreases.

In one aspect, an object of the embodiments is to improve a throughput of an arithmetic processing device that sequentially executes a plurality of data processes divided into a plurality of pipeline stages.

Hereinafter, embodiments will be described with reference to the drawings.

Figure 1:
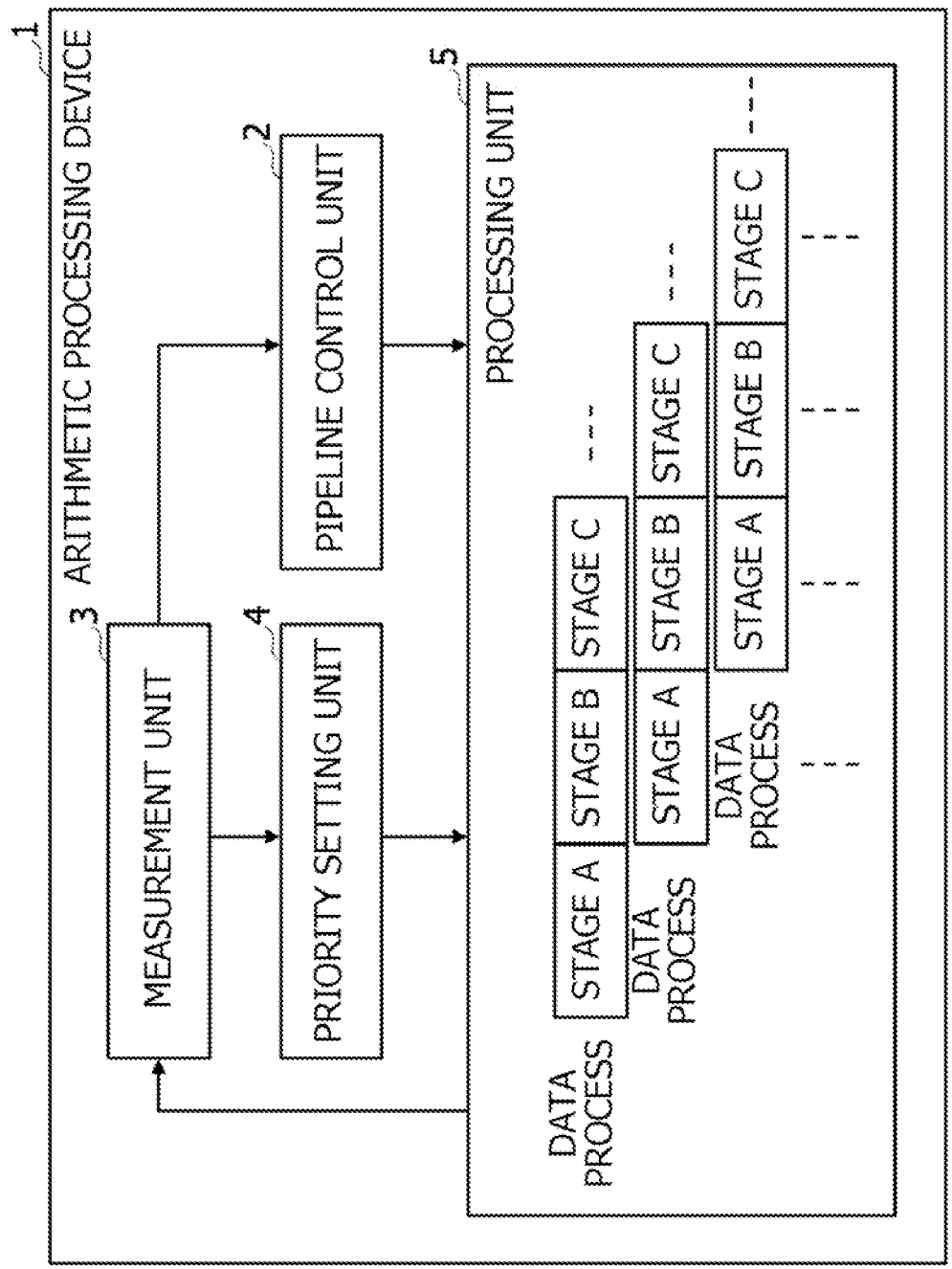
FIG. 1 is a block diagram illustrating an example of an arithmetic processing device according to an embodiment.

FIG. 1 illustrates an example of an arithmetic processing device according to an embodiment. An arithmetic processing device 1 illustrated in FIG. 1 includes a pipeline control unit 2, a measurement unit 3, a priority setting unit 4, and a processing unit 5. For example, the arithmetic processing device 1 is a processor such as a central processing unit (CPU). The pipeline control unit 2, the measurement unit 3, and the priority setting unit 4 may also be realized by a control program executed by the arithmetic processing device 1 or may also be realized by hardware. Moreover, the pipeline control unit 2, the measurement unit 3, and the priority setting unit 4 may also be realized by software and hardware in cooperation.

For example, the processing unit 5 may also be realized by a plurality of operation cores mounted on the arithmetic processing device 1. The processing unit 5 executes pipeline parallel processing for executing each of a plurality of data processes in parallel at different timings. Processing content of the plurality of data processes is the same as each other, except for that pieces of input data are different from each other and pieces of output data are different from each other.

Note that the arithmetic processing device 1 may also be realized by a server that includes a processor such as a CPU and an accelerator such as a graphics processing unit (GPU). In this case, the arithmetic processing device 1 may also be realized by an information processing device such as a server having a control substrate on which the processor and the accelerator are mounted, or the like. The pipeline control unit 2, the measurement unit 3, and the priority setting unit 4 may also be realized by a control program executed by the processor. The processing unit 5 may also be realized by a plurality of operation cores mounted on the accelerator.

In a case where the processing unit 5 is realized by the accelerator, the pipeline control unit 2 causes the processing unit 5 to execute the data process via a driver that controls an operation of the accelerator. Note that the driver includes an application programmable interface (API) and communicates with the pipeline control unit 2 via the API.

In the example illustrated in FIG. 1, each data process is divided into a plurality of stages A, B, C, . . . to be executed. Each of the stages A, B, C, . . . is executed using any one of the plurality of operation cores included in the processing unit 5. For example, the operation cores that respectively execute the stages A, B, C, . . . are different from each other. Each of the stages A, B, C, . . . is an example of a pipeline stage. In the following, in a case where the stages A, B, C, . . . are described without being distinguished from each other, the stages A, B, C, . . . are simply referred to as stages.

The pipeline control unit 2 causes the processing unit 5 to execute the plurality of data processes in parallel at different timings. The measurement unit 3 causes the processing unit 5 to execute each of the plurality of stages while changing the input data in an initialization period (evaluation period) before the pipeline control unit 2 causes the processing unit 5 to execute the plurality of data processes and measures a processing time of each stage. Then, the measurement unit 3 acquires a statistical value of the processing time of each stage. For example, the measurement unit 3 causes the processing unit 5 to execute each stage via the pipeline control unit 2 and measures the processing time.

The priority setting unit 4 sets a priority of each stage in a descending order of the processing time in the initialization period on the basis of the processing time of each stage measured by the measurement unit 3. Note that, for example, the priority setting unit 4 may also set priorities of a predetermined number of top stages having a long processing time in the descending order of the processing time and does not need to set priorities of other stages. Alternatively, the priority setting unit 4 may also set the lowest priority to the other stage. For example, in a case where the processing unit 5 is realized by the accelerator, the priority setting unit 4 changes the priority for each of the plurality of stages by hooking the API of the driver of the accelerator.

In this embodiment, the priority setting unit 4 sets the priorities of the stages in the descending order of the processing time on the basis of the processing time of each stage measured by the measurement unit 3. Therefore, in the subsequent data process, a process of the stage having the high priority can be executed without being interrupted by other processes.

Therefore, even in a case where there is a state of which a processing time is extended due to an interrupt of the other process, the processing unit 5 can shorten the processing time of the stage by changing the priorities. As a result, the arithmetic processing device 1 can prevent execution of a stage having a long processing time from waiting in the data processes sequentially executed by the processing unit 5. As a result, as illustrated in FIG. 1, the arithmetic processing device 1 can substantially equalize the processing times of the respective stages, and it is possible to enhance an execution efficiency of the data process through the pipeline parallel processing. For example, in this embodiment, it is possible to improve a throughput of the arithmetic processing device 1 that executes the plurality of data processes divided into the plurality of pipeline stages.

In a case where the processing unit 5 is realized by the accelerator, the priority setting unit 4 changes the priority for each of the plurality of stages by hooking the API of the driver of the accelerator. As a result, even in a case where it is not possible for the pipeline control unit 2 to set the priority of each stage, the arithmetic processing device 1 can appropriately set the priority according to an actual processing time of each stage by the priority setting unit 4.

The measurement of the processing time by the measurement unit 3 and the change of the priority by the priority setting unit 4 are performed in the initialization period before the processing unit 5 sequentially executes the plurality of data processes in parallel. Because the priority of each stage is changed in advance, the arithmetic processing device 1 can suppress a decrease in the processing efficiency at the time when the data process is executed.

Figure 2:
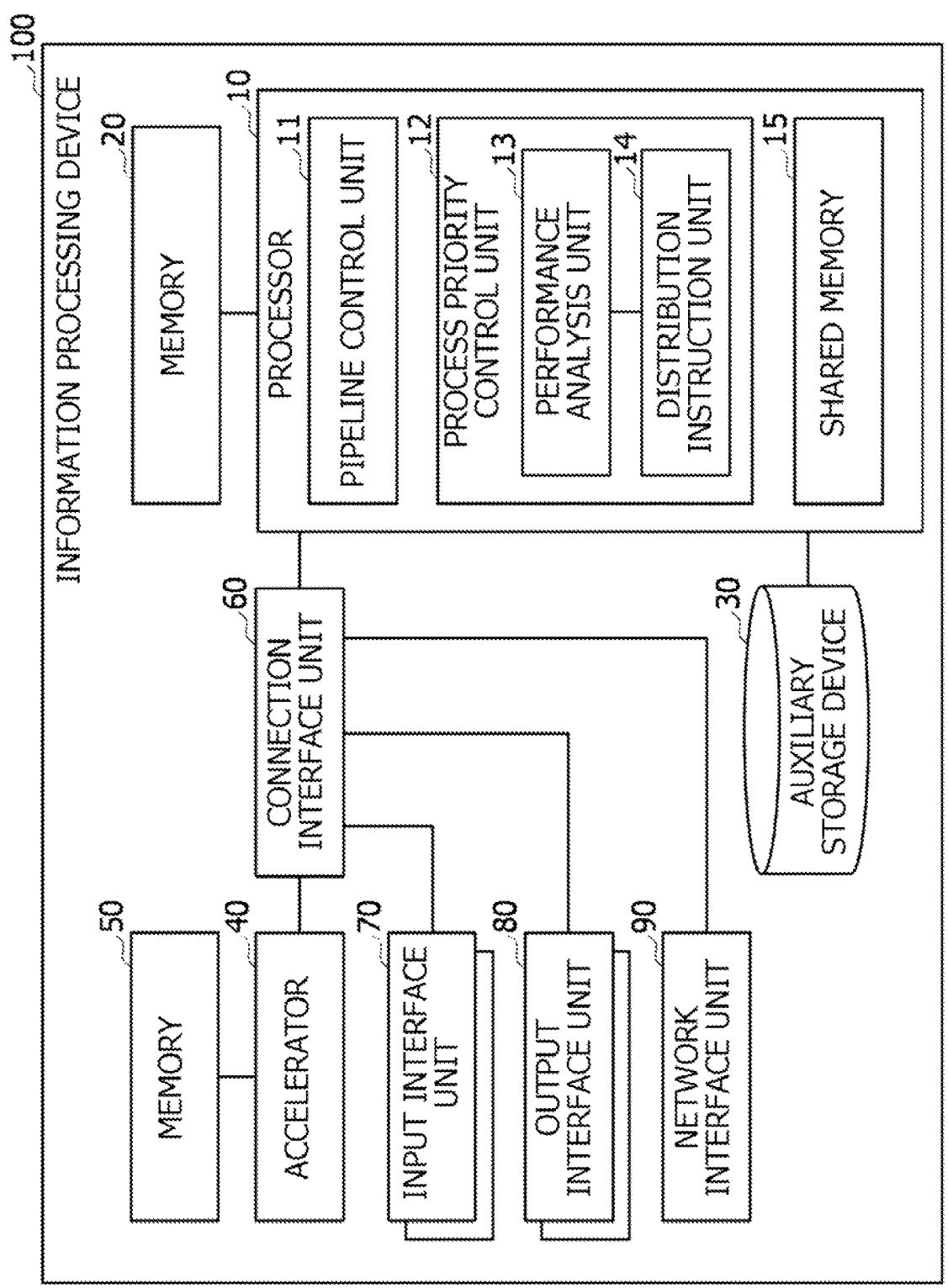
FIG. 2 is a block diagram illustrating an example of an information processing device including an arithmetic processing device according to another embodiment.

FIG. 2 illustrates an example of an information processing device including an arithmetic processing device according to another embodiment. An information processing device 100 illustrated in FIG. 2 is, for example, a server or the like and includes a processor 10, a memory 20, an auxiliary storage device 30, an accelerator 40, a memory 50, a connection interface unit 60, an input interface unit 70, an output interface unit 80, and a network interface unit 90.

The processor 10 is, for example, a CPU and includes a pipeline control unit 11, a process priority control unit 12, and a shared memory 15 such as a static random access memory (SRAM). The pipeline control unit 11 and the process priority control unit 12 may also be realized by executing a control program stored in the memory 20 by the processor 10. Note that the processor 10 may also include a plurality of cores, and the number of processors 10 mounted on the information processing device 100 may also be equal to or more than two.

The process priority control unit 12 includes a performance analysis unit 13 and a distribution instruction unit 14. The performance analysis unit 13 is an example of a measurement unit, and the distribution instruction unit 14 is an example of a priority setting unit. The performance analysis unit 13 measures a processing time of each of operation stages 43*a* and 43*b* of a pipeline 41 described with reference to FIG. 3. The distribution instruction unit 14 sets priorities of the respective operation stages 43*a* and 43*b* in the descending order of the processing time on the basis of the processing time for each of the operation stages 43*a* and 43*b* measured by the performance analysis unit 13. Examples of functions of the performance analysis unit 13 and the distribution instruction unit 14 will be described with reference to FIGS. 5 and 6.

The memory 20 is, for example, a main storage device such as a dynamic random access memory (DRAM). The memory 20 holds the control program to be executed by the processor 10 and various types of data. The auxiliary storage device 30 is a hard disk drive (HDD), a solid state drive (SSD), or the like. The auxiliary storage device 30 holds a control program to be transferred to the memory 20, input data of a data process executed by the accelerator 40, configuration information of a neural network for executing the data process, or the like.

The accelerator 40 is, for example, a GPU and can execute an operation for a specific process at high speed. In this embodiment, the accelerator 40 executes a data process such as an image recognition process using a learned neural network on the basis of an instruction from the processor 10. The memory 50 is, for example, a main storage device such as a DRAM. The memory 50 holds input data used for the data process and output data that is a result of the data process. Note that it is not possible for the accelerator 40 to directly access the shared memory 15 of the processor 10.

Therefore, data used by the accelerator 40 of the data held by the shared memory 15 is transferred from the shared memory 15 to the memory 50.

The connection interface unit 60 is, for example, a peripheral component interconnect express (PCIe) switch or the like. The connection interface unit 60 connects the processor 10, the accelerator 40, the input interface unit 70, the output interface unit 80, and the network interface unit 90 with each other.

One of the input interface units 70 is connected to a camera (not illustrated) that captures a moving image or the like, and moving image data acquired by the camera is input to the input interface unit 70. Furthermore, another one of the input interface units 70 may also be connected to a mouse, a keyboard, or the like (not illustrated). The output interface unit 80 is connected to a display or the like (not illustrated) that displays an image, text, or the like. The network interface unit 90 is, for example, a network interface card (NIC) and is connected to a network (not illustrated).

Figure 3:
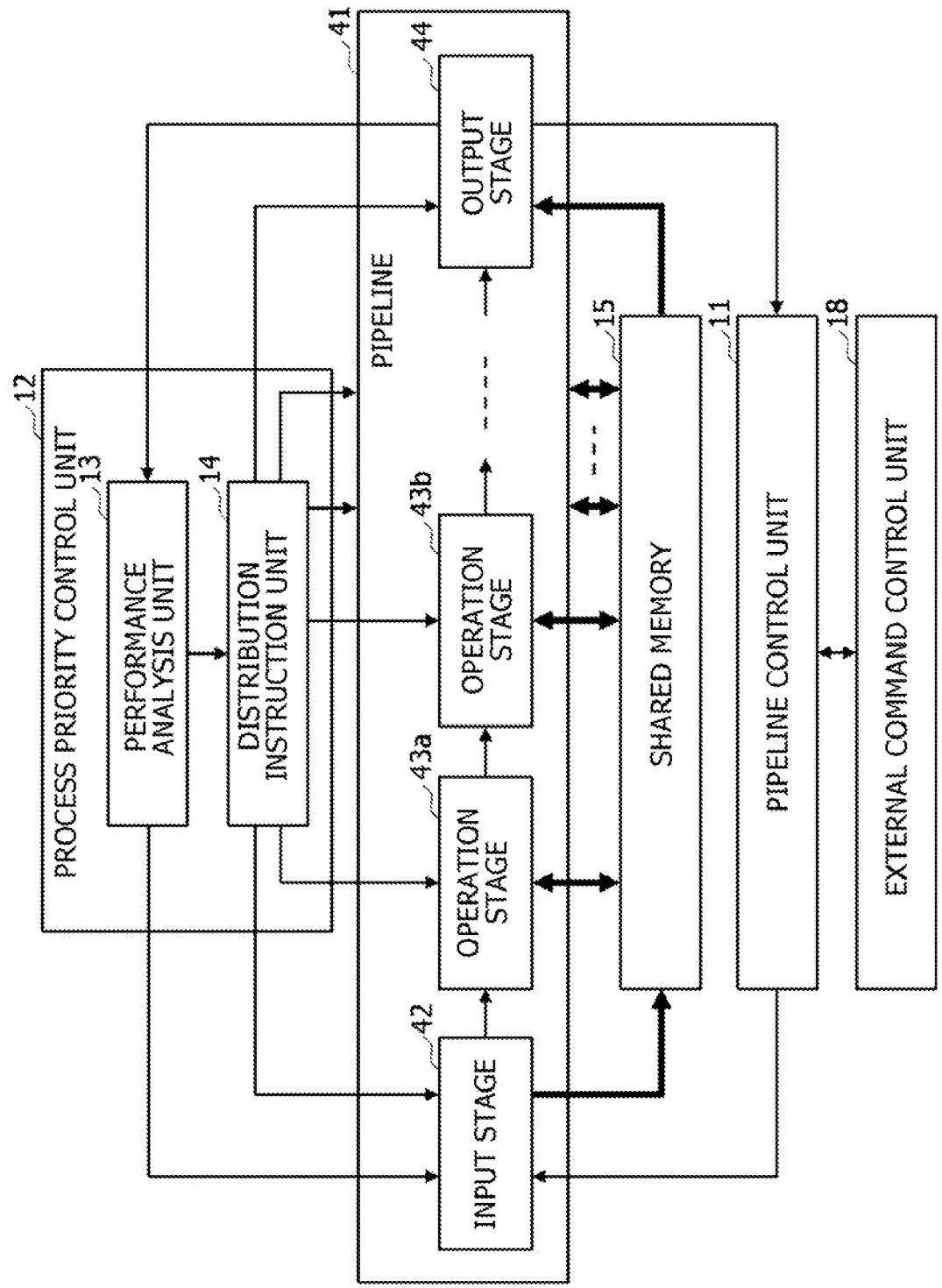
FIG. 3 is a block diagram illustrating an example of a functional configuration of a pipeline system realized by the information processing device in FIG. 2.

FIG. 3 illustrates an example of a functional configuration of a pipeline system realized by the information processing device 100 in FIG. 2. In FIG. 3, a thick arrow indicates a data transmission path, and a thin arrow indicates a transmission path of a control signal such as commands. The pipeline 41 that divides a data process into a plurality of stages and executes the stages in parallel includes an input stage 42, a plurality of operation stages 43 (43a, 43b, or the like), and an output stage 44. For example, the data process by the pipeline 41 is executed by at least one of the processor 10 and the accelerator 40.

Before the data process by the pipeline 41 starts, the performance analysis unit 13 sequentially supplies data from the input stage 42 to each operation stage 43. By receiving a processing result of each operation stage 43 via the output stage 44, the performance analysis unit 13 measures a processing time. Note that the performance analysis unit 13 may also sequentially supply data for each focused operation stage 43 and measure a processing time on the basis of the end of the operation by the focused operation stage 43. The distribution instruction unit 14 sets the priorities of the respective operation stages 43 in the descending order of the processing time before the data process by the pipeline 41 starts, on the basis of the processing time of each operation stage 43 measured by the performance analysis unit 13.

In a case where the data process by the pipeline 41 starts, the pipeline control unit 11 issues a command to start to execute an operation of each data process. At the time of issuing the command, the pipeline control unit 11 makes it possible to identify a data process to be executed by giving an identification (ID) unique to data to be processed. For example, in a case where the data process executed by the pipeline 41 is a moving image recognition process, the unique ID is a frame number of the image or the like. By receiving a process completion notification from the output stage 44 when the data process by the pipeline 41 ends, the pipeline control unit 11 recognizes the remaining number of data processes being executed by the pipeline 41.

The input stage 42 receives input data such as image data via the input interface unit 70 or the network interface unit 90 in FIG. 2 and writes the received input data into the shared memory 15. Note that each stage of the pipeline 41 can access the shared memory 15. The input stage 42 avoids overwriting of the input data on the shared memory 15 by determining a writing destination of the input data according to the unique ID.

The process by the plurality of operation stages 43a and 43b is executed, for example, by the accelerator 40 or the processor 10. Each of the operation stages 43a and 43b acquires data to be processed from the shared memory 15 on the basis of the unique ID received from the previous stage. Then, each of the operation stages 43a and 43b executes the operation using the acquired data and writes data indicating an operation result, as a processing result, into a storage region of the shared memory 15 allocated according to the unique ID.

The output stage 44 acquires a processing result from the storage region of the shared memory 15 corresponding to the unique ID. The output stage 44 transmits the acquired processing result to an output device via the output interface unit 80 in FIG. 2 or transmits the acquired processing result to a remote node of a network destination via the network interface unit 90 in FIG. 2. The output stage 44 notifies the pipeline control unit 11 of that the data in the shared memory 15 used for the data process with the unique ID can be reused.

An external command control unit 18 receives a command from outside to the pipeline system illustrated in FIG. 3 and outputs the received command to the pipeline control unit 11. For example, the command received by the external command control unit 18 may also be issued by a user program for requesting a data process or the like. Note that, in the following description, the operation stage 43 (43a, 43b, or the like) is also simply referred to as a stage 43 (43a, 43b, or the like).

Figure 4:
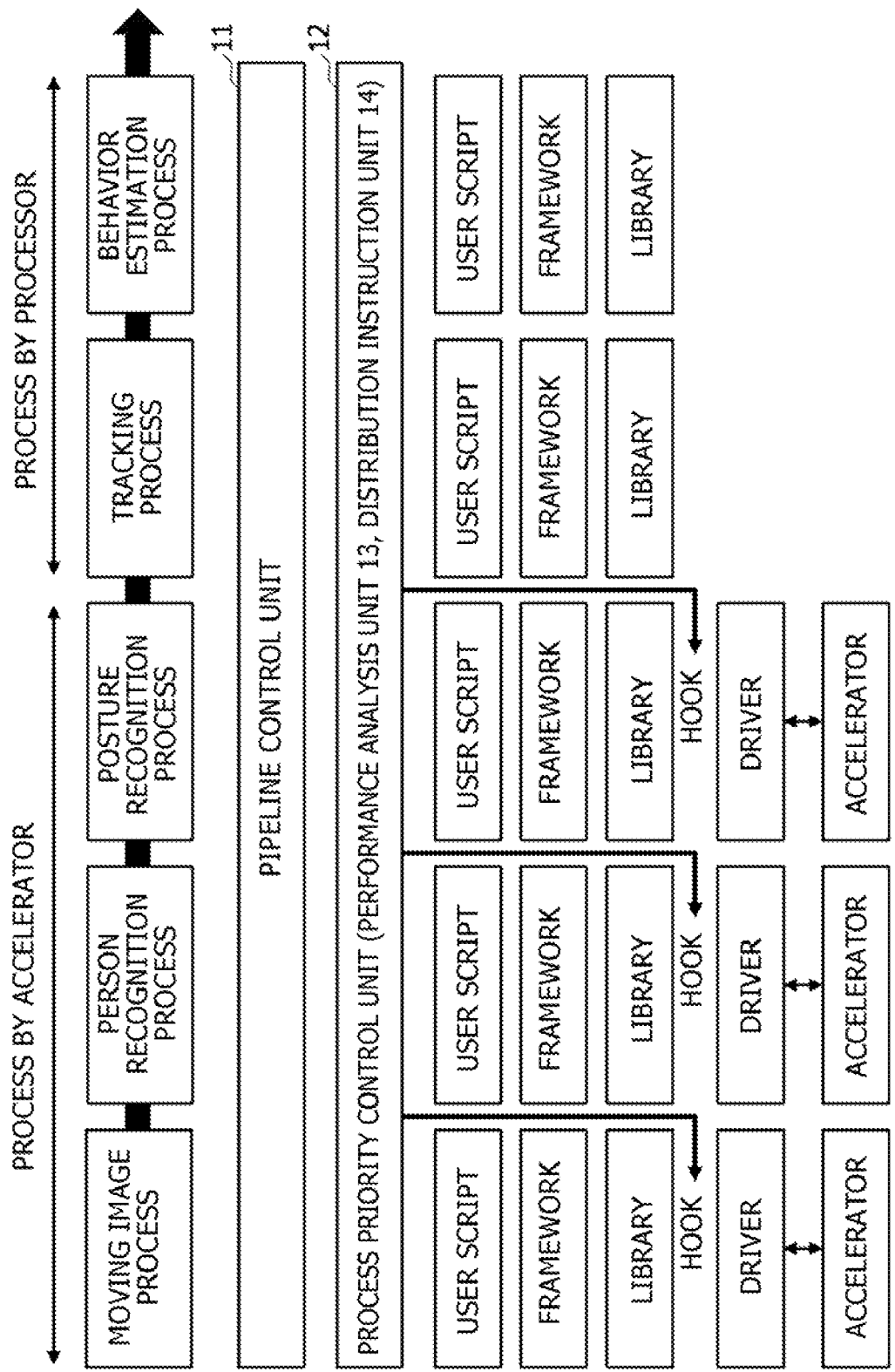
FIG. 4 is an explanatory diagram illustrating an example of an image recognition process using a learned neural network executed by the information processing device in FIG. 2.

FIG. 4 illustrates an example of an image recognition process using a learned neural network executed by the information processing device 100 in FIG. 2. For example, in the image recognition process illustrated in FIG. 4, the information processing device 100 recognizes a person in each frame of a moving image received from a camera or the like in real time and estimates a behavior of the person from movements of the person in previous and next frames.

In the image recognition process, the information processing device 100 sequentially executes a moving image process, a person recognition process, a posture recognition process, a tracking process, and a behavior estimation process. In the example illustrated in FIG. 4, each of the moving image process, the person recognition process, and the posture recognition process is executed as a process of the operation stage 43 by the accelerator 40 on the basis of the instruction of the processor 10. The moving image process, the person recognition process, and the posture recognition process may cause resource conflict of the accelerator 40.

Each of the tracking process and the behavior estimation process is executed as the process of the operation stage 43 by the processor 10. Note that the moving image process, the person recognition process, the posture recognition process, the tracking process, and the behavior estimation process may also be executed by only the accelerator 40 or only the processor 10.

The accelerator 40 sequentially extracts frame data corresponding to a single image from moving image data in the moving image process. The accelerator 40 extracts a person from each piece of the frame data in the person recognition process. The accelerator 40 recognizes a posture of the extracted person for each frame in the posture recognition process.

The processor 10 detects a change in the posture of the person recognized through the posture recognition process between the previous and next frames and determines a movement of the person in the tracking process. For example, the movement of the person includes stopping, walking, running, about to sit, or the like. In the behavior estimation process, the processor estimates a behavior of the person on the basis of a determination result of the tracking process.

User scripts of the moving image process, the person recognition process, and the posture recognition process are executed by the accelerator 40 via a framework, a library, and a driver of the accelerator 40. Furthermore, user scripts of the tracking process and the behavior estimation process are executed by the processor 10 via the framework and the library. As described above, the distribution instruction unit 14 of the process priority control unit 12 sets the priority for each of the plurality of stages by hooking an API of the driver of the accelerator 40.

Figure 5:
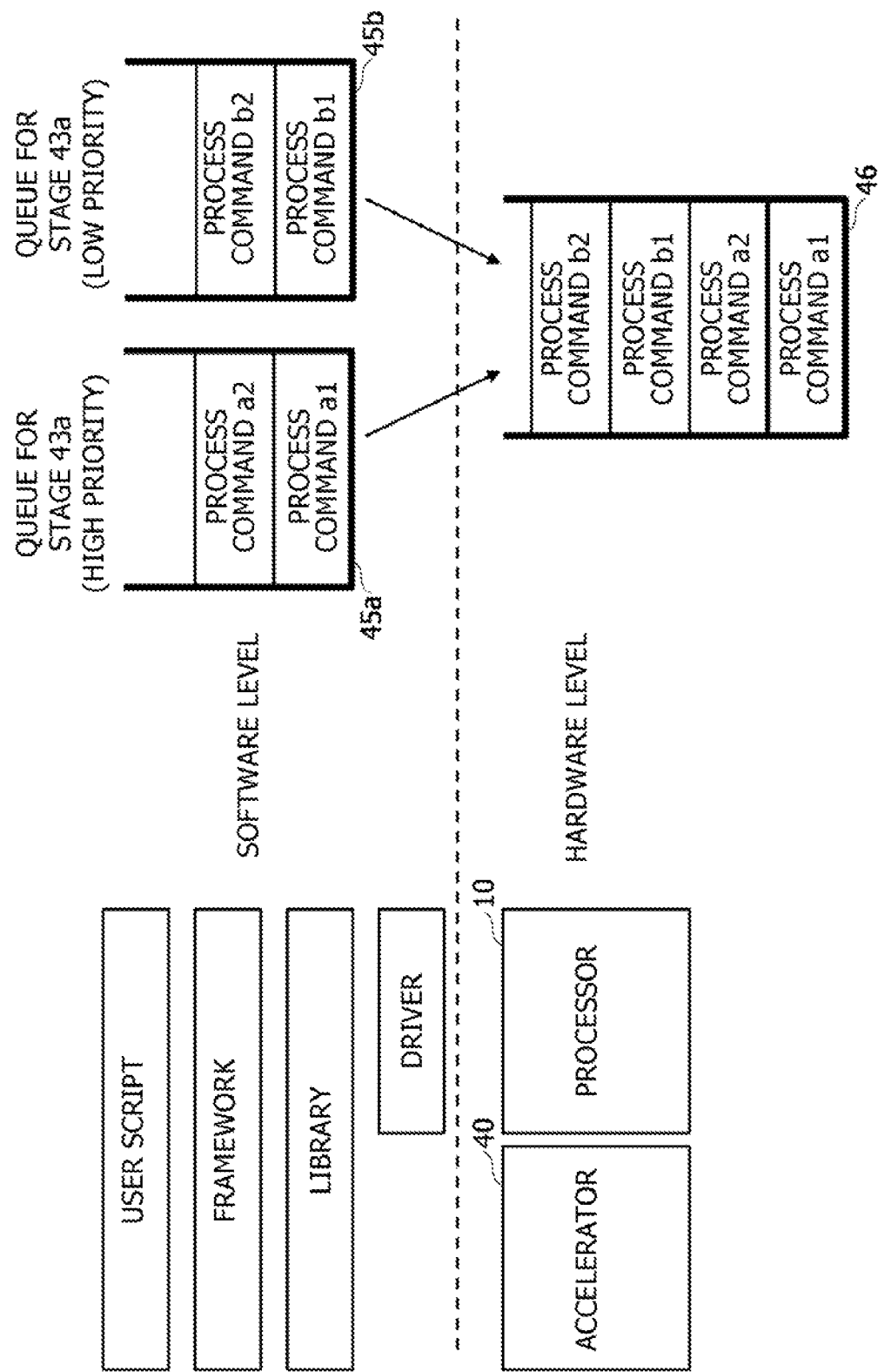
FIG. 5 is an explanatory diagram illustrating an example in which a process command is input to an accelerator in FIG. 2 according to a priority for each operation stage.

FIG. 5 illustrates an example in which a process command is input to the accelerator 40 to the priority for each operation stage 43. For example, a framework used for deep learning, a recognition process after deep learning, or the like hides low-level APIs so as not to include detailed control in description of the user scripts.

Furthermore, in a case where an external device such as the accelerator 40 is used for deep learning, the recognition process, or the like, the framework also hides an API of a driver related to the accelerator 40 or the like. Moreover, the framework hides libraries such as mathematical operations. As a result, the description according to the user script can be created in consideration of an API provided by the framework. In other words, the description according to the user script can be generated without considering which one of the processor 10 or the accelerator 40 executes a calculation process.

Moreover, in this embodiment, a queue creation API with a priority for each operation stage 43 used to manage the process command to the accelerator 40 is hidden. For example, the process command is input to the accelerator 40 via software-level queues 45 (45*a* and 45*b*) managed by the driver of the accelerator 40 and a hardware-level queue 46 managed by the accelerator 40.

In a case where there is a free hardware-level queue 46, the software-level queue 45 inputs a process command to the hardware-level queue 46. The accelerator 40 executes the process commands input from the hardware-level queue 46 in an input order. When the commands are input from the software-level queue 45 to the hardware-level queue 46, a queue with a higher priority is prioritized.

FIG. 5 illustrates the software-level queues 45*a* and 45*b* respectively corresponding to the operation stages 43*a* and 43*b*. The queue 45*a* corresponding to the operation stage 43*a* has a higher priority than the queue 45*b* corresponding to the operation stage 43*b*. Therefore, process commands a1 and a2 held by the queue 45*a* are input to the hardware-level queue 46 in priority to process commands b1 and b2 held by the queue 45*b*. Then, the queue 46 inputs the process commands a1, a2, b1, and b2 in the accelerator 40 in a held order. As a result, the process by the operation stage 43*a* is executed in priority to the process by the operation stage 43*b*.

Figure 6:
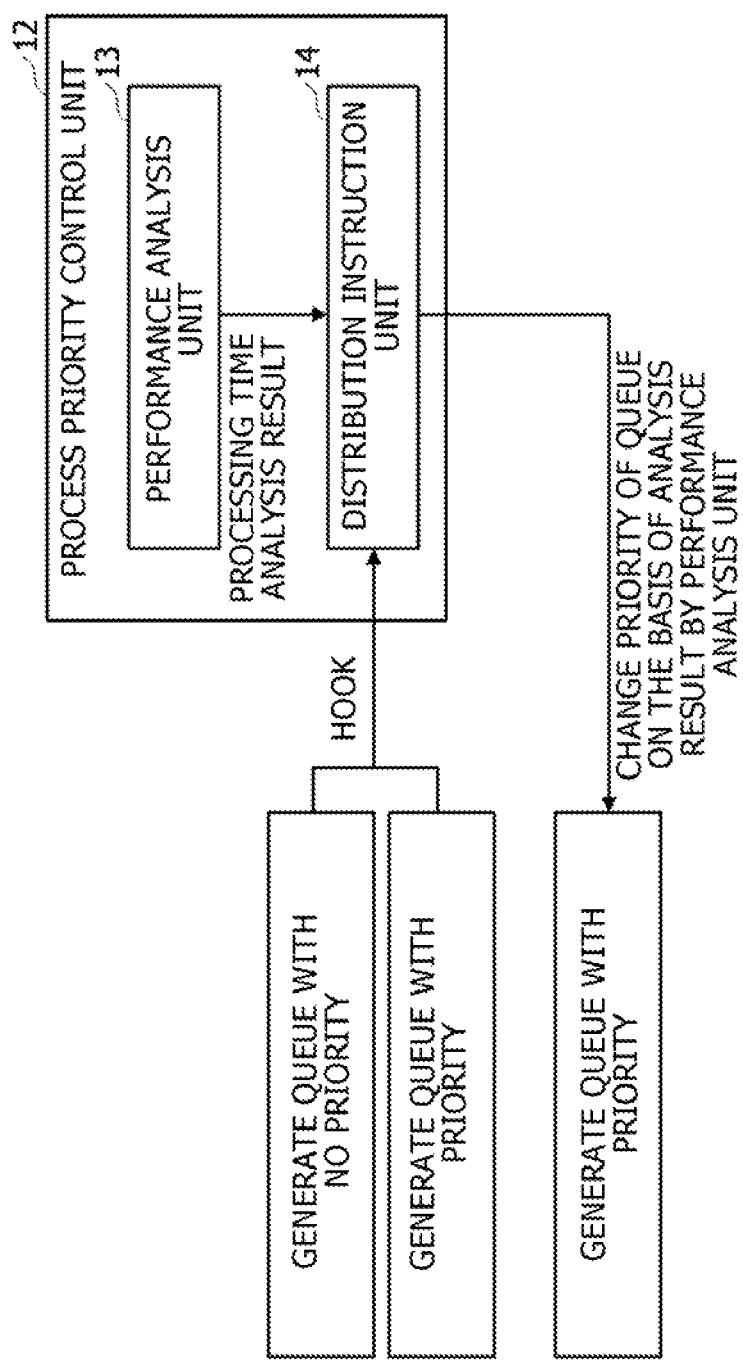
FIG. 6 is an explanatory diagram illustrating an example in which a distribution instruction unit of a process priority control unit in FIG. 4 changes a priority of a queue by hooking an API.

FIG. 6 illustrates an example in which the distribution instruction unit 14 of the process priority control unit 12 in FIG. 4 changes the priorities of the queues by hooking the API. The distribution instruction unit 14 hooks both of a function for generating a queue with no priority by the API of the driver and a function for generating a queue with a priority. Then, the distribution instruction unit 14 changes the function for generating the queue by the API to the function for generating the queue with the priority to which the priority is set on the basis of the processing time of the operation stage 43 measured by the performance analysis unit 13.

Although not particularly limited, the function for generating the queue with no priority is "cuStreamCreate", and the function for generating the queue with the priority is "cuStreamCreateWithPriority".

Figure 7:
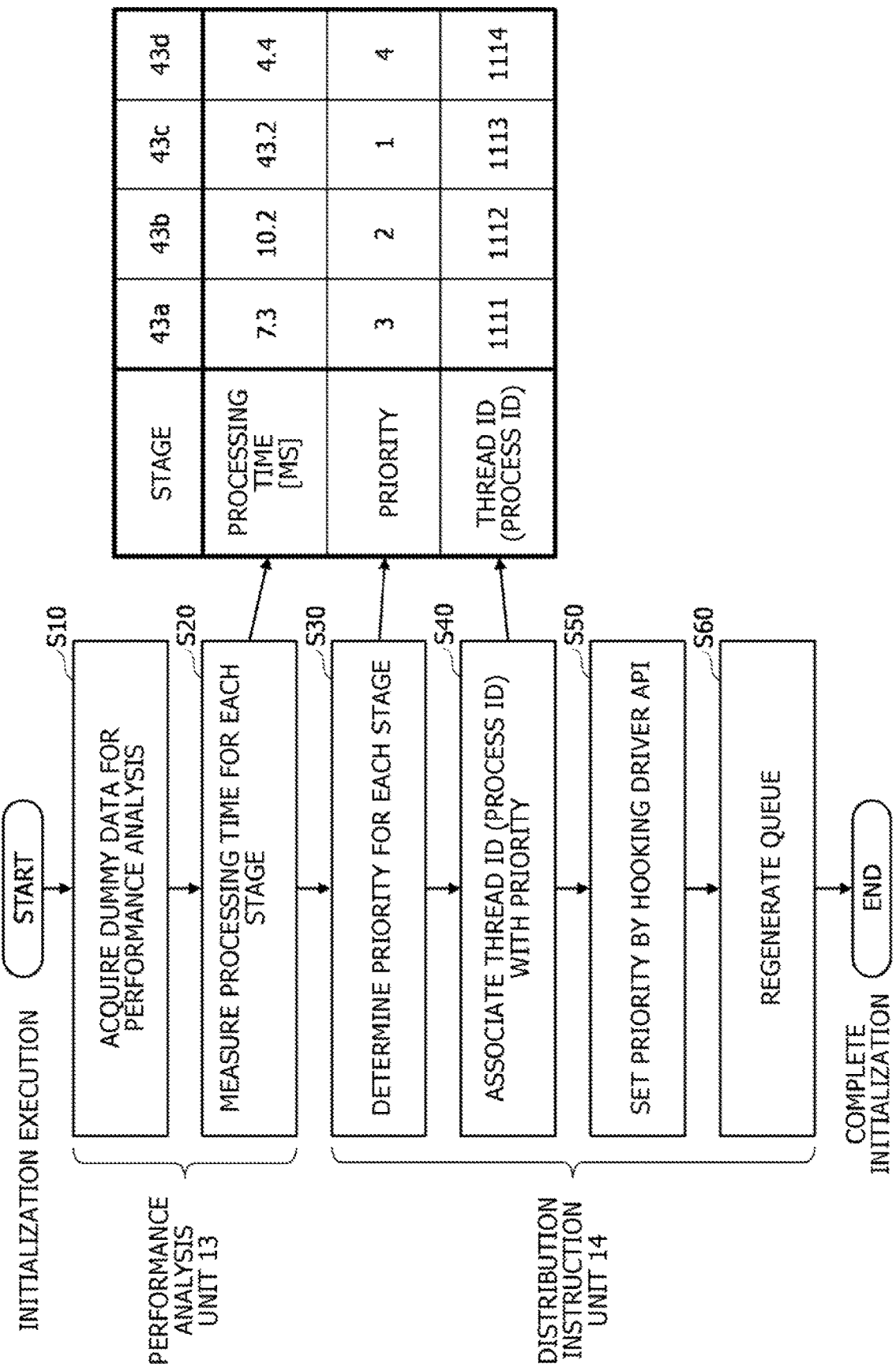
FIG. 7 is a flowchart illustrating an example of an operation of the process priority control unit in FIG. 4.

FIG. 7 illustrates an example of an operation of the process priority control unit 12 in FIG. 4. A process flow illustrated in FIG. 7 is realized by executing the control program by the processor 10. For example, FIG. 7 illustrates an example of an arithmetic processing method by the processor 10. The process flow illustrated in FIG. 7 is executed in the initialization period (evaluation period) before the pipeline control unit 11 causes the accelerator 40 to execute the plurality of data processes.

First, in step S10, the performance analysis unit 13 of the process priority control unit 12 acquires dummy data for performance analysis from the memory 20 or the auxiliary storage device 30 and writes the dummy data in the shared memory 15. The dummy data includes the input data for causing the accelerator 40 to execute the operation of each stage 43. Then, the performance analysis unit 13 transfers the dummy data from the shared memory 15 to the memory 50 and causes the accelerator 40 to execute an operation process of each stage 43.

Next, in step S20, the performance analysis unit 13 measures a processing time involved in the operation process of each stage 43. In the example illustrated in FIG. 7, a processing time of a stage 43*c* is the longest, and a processing time of a stage 43*d* is the shortest.

Next, in step S30, the distribution instruction unit 14 of the process priority control unit 12 sets priorities of the respective stages 43 in the descending order of the processing time on the basis of the processing time measured by the performance analysis unit 13. For example, the distribution instruction unit 14 sets the priority of the stage 43*c* with the longest processing time to "1" that is the highest, and sets the priority of the stage 43*b* with the second longest processing time to "2" that is the second highest. The distribution instruction unit 14 sets the priority of the stage 43*a* with the third longest processing time to "3" and sets the priority of the stage 43*d* with the shortest processing time to "4".

Next, in step S40, the distribution instruction unit 14 associates a thread ID (or process ID) that executes the operation process of each stage 43 with the priority. For example, the distribution instruction unit 14 associates the priority "1" of the stage 43*a* with a thread ID (or process ID) "1113" that executes the operation process of the stage 43*c*. The distribution instruction unit 14 associates the priority "2" of the stage 43*b* with a thread ID (or process ID) "1112" that executes the operation process of the stage 43*b*. The distribution instruction unit 14 also associates the priorities of the other stages 43 with thread IDs.

Next, in step S50, as described with reference to FIG. 6, the distribution instruction unit 14 changes the priority determined in step S30 for each stage 43 by hooking the API of the driver of the accelerator 40. Next, in step S60, the distribution instruction unit 14 regenerates the queue 45 having the priority set in step S50 and completes the initialization operation illustrated in FIG. 7.

Figure 8:
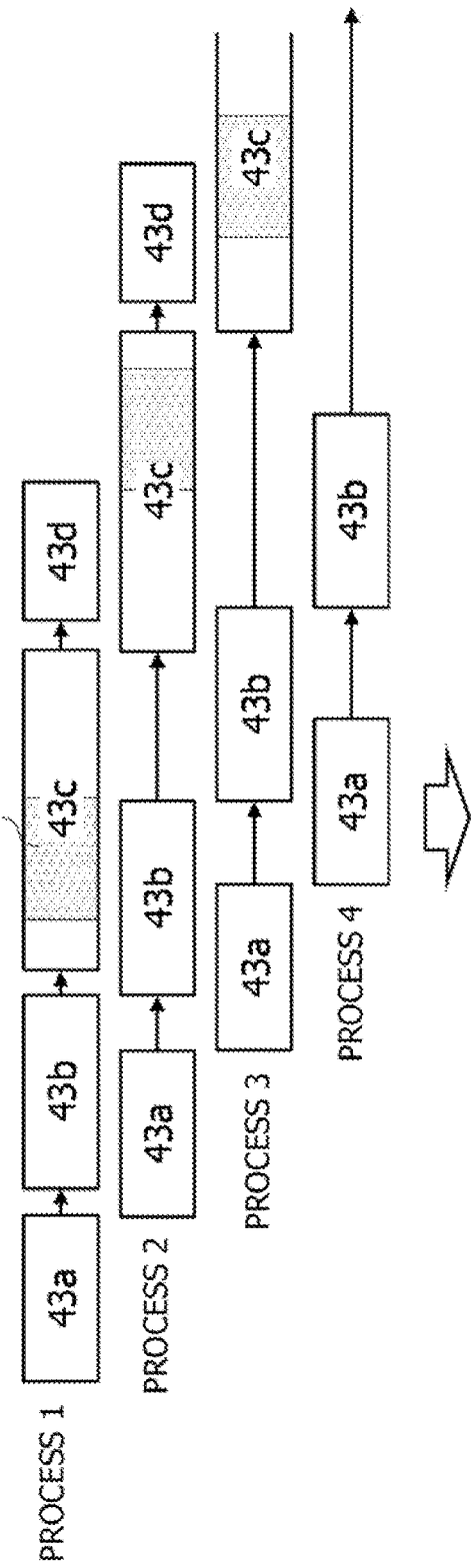
FIG. 8 is an operation sequence diagram illustrating an example of pipeline parallel processing executed by the information processing device in FIG. 2.
Figure 8:
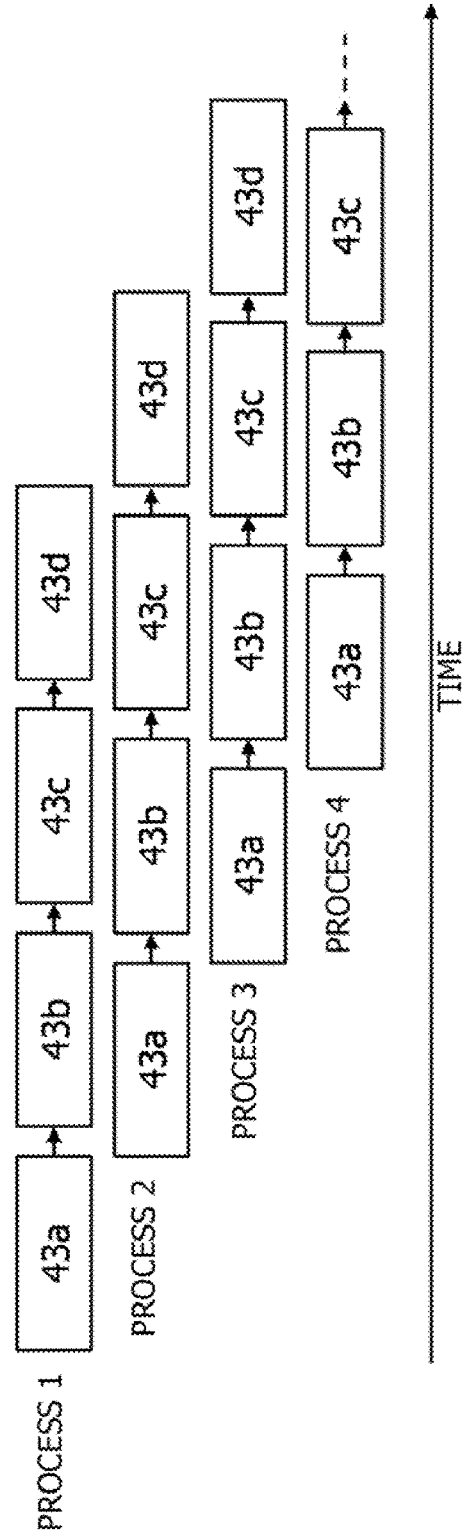

FIG. 8 illustrates an example of pipeline parallel processing executed by the information processing device 100 in FIG. 2. In the pipeline parallel processing illustrated in FIG. 8, the image recognition process using the learned neural network illustrated in FIG. 4 is executed. The upper side of FIG. 8 illustrates an example of the pipeline parallel processing in a case where the process priority control unit 12 does not operate and the priority does not correspond to the length of the processing time. The lower side of FIG. 8 illustrates an example of the pipeline parallel processing in a case where the process priority control unit 12 operates and the priority corresponds to the length of the processing time.

In a case where the process priority control unit 12 does not operate, as illustrated in FIG. 7, the processing times become longer in the order of the stages 43*c*, 43*b*, 43*a*, and 43*d*. Because the processing times of the respective stages 43 vary, a waiting time before an operation of the subsequent stage 43 is started and between the adjacent two stages 43 easily occurs. The waiting time increases as the processing time of the subsequent stage 43 increases and is accumulated as the pipeline parallel processing progresses. Therefore, in a case where the process priority control unit 12 does not operate, an execution efficiency of the operation process with the pipeline parallel processing decreases.

Note that, in pipeline design, process amounts in respective stages are set to be almost equal to each other. However, for example, an interrupt of another operation process during the operation process of the stage 43*c* extends the processing time of the stage 43*c*. The interrupt of the operation process more easily occurs as the priority set to the stage 43*c* is lower. Note that, in FIG. 8, the other operation processes collectively interrupt during the operation process of the stage 43*c*. However, the interrupt of the other operation processes may also occur a plurality of times at intervals.

On the other hand, in a case where the process priority control unit 12 operates, the distribution instruction unit 14 sets the priorities of the respective stages 43 in the descending order of the processing time. As a result, because the priority of the stage 43 in which a frequency of the interrupt is high and the processing time is extended is set to be higher, it is possible to set the processing times of the respective stages to be almost equal to each other.

Therefore, the processor 10 can shorten the waiting time before the operation of the subsequent stage 43 is started between the adjacent two stages 43. As a result, the processor 10 can reduce unnecessary waiting time than that in a case where the process priority control unit 12 does not operate, and the execution efficiency of the operation process with the pipeline parallel processing can be improved. For example, in this embodiment, the throughput of the information processing device 100 that executes the plurality of data processes divided into the plurality of pipeline stages can be improved.

Figure 9:
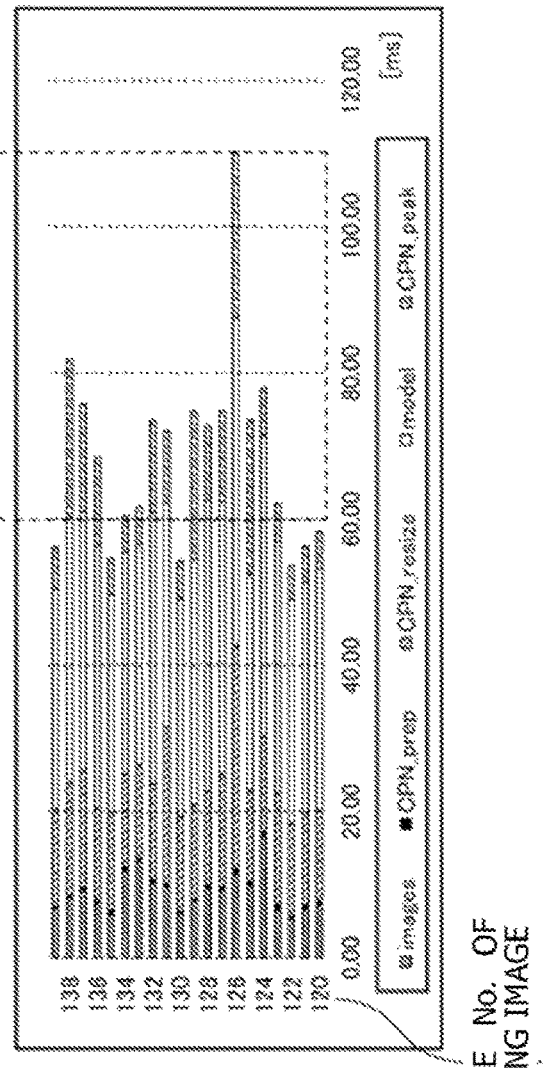
FIG. 9 is an explanatory diagram illustrating an example of a change in processing time before and after priority control by the process priority control unit in FIG. 4.
Figure 9:
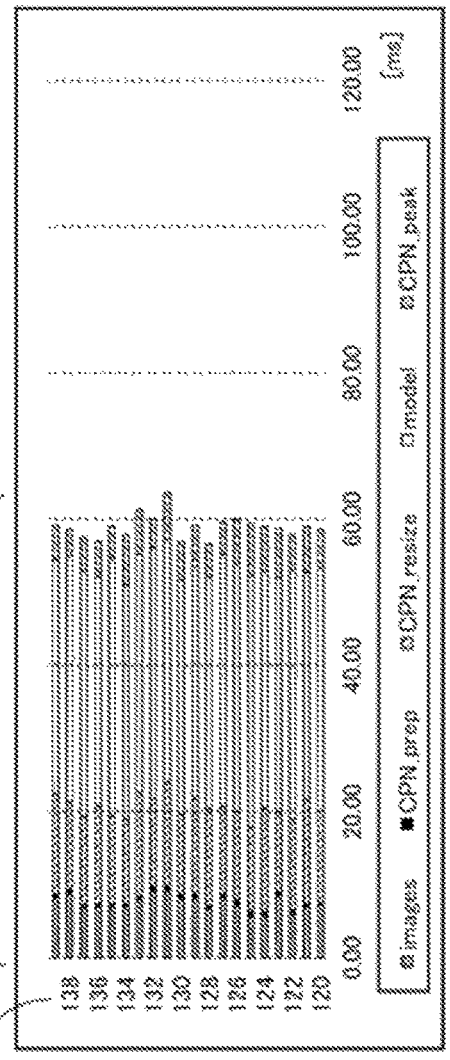

FIG. 9 illustrates an example of a change in a processing time before and after priority control by the process priority control unit 12 in FIG. 4. FIG. 9 illustrates a change in a processing time in a case where frames from a frame 120 in a moving image to a frame 138 are processed in real time in the stage 43*c* with the longest processing time according to the measurement in FIG. 7.

The processing time before priority control corresponds to a case where the process priority control unit 12 in FIG. 8 does not operate, and the processing time after priority control corresponds to a case where the process priority control unit 12 in FIG. 8 operates. In the processing time of each frame, "images" indicates reading of input data, "CPN_prep" indicates preprocessing, and "CPN_resize" indicates resizing of image data. "Model" indicates image processing, and "CPN_peak" indicates post-processing.

Before priority control, the processing time largely varies depending on the frame. The process amounts of the respective frames in the stage 43*c* are almost the same. Therefore, the processing time increases due to a delay of a process caused by the interrupt of the other process. The maximum processing time before priority control is 112 ms. For example, in a case where the moving image is processed without missing frames, inputs of the moving image from the camera can be suppressed to be equal to or less than eight frames per second.

On the other hand, after priority control in which the priority is set to be high, the maximum processing time is improved to 63 ms. In a case where the moving image is processed without missing the frame, the moving image up to 15 frames per second can be input from the camera. Therefore, the processor 10 can improve a performance of the image recognition process by performing priority control by the process priority control unit 12.

As described above, an effect similar to the above-described embodiment can be obtained in this embodiment. For example, it is possible to shorten the processing time of the stage 43 of which the processing time is extended by the interrupt of the other process before the priority is set. Therefore, the information processing device 100 can substantially equalize the processing times of the plurality of stages 43 in the pipeline parallel processing for sequentially executing the plurality of data processes each of which is divided into the plurality of stages 43. As a result, the information processing device 100 can improve the execution efficiency of the data process with the pipeline parallel processing.

The distribution instruction unit 14 changes the priority for each of the plurality of stages 43 by hooking the API of the driver of the accelerator 40. As a result, even in a case where it is not possible to set the priority of each stage 43 by the pipeline control unit 11, the distribution instruction unit 14 of the information processing device 100 can set the priority according to the actual processing time of each stage 43. The measurement of the processing time by the performance analysis unit 13 and the setting of the priority by the distribution instruction unit 14 are performed in the initialization period before the accelerator 40 sequentially executes the plurality of data processes in parallel. Because the priority of each stage 43 is preset, the information processing device 100 can suppress a decrease in the processing efficiency at the time when the data process is executed.

From the detailed description above, characteristics and advantages of the embodiments will become apparent. This intends that claims cover the characteristics and advantages of the embodiment described above without departing from the spirit and the scope of the claims. Furthermore, one of ordinary knowledge in the corresponding technical field may easily achieve various improvements and modifications. Therefore, there is no intention to limit the scope of the inventive embodiments to those described above, and the scope of the inventive embodiment may rely on appropriate improvements and equivalents included in the scope disclosed in the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
a memory; and
a processor coupled to the memory and configured to:
execute a plurality of data processes each of which is divided into a plurality of pipeline stages in parallel at different timings;
measure a processing time of each of the plurality of pipeline stages;
set a priority of the plurality of pipeline stages in a descending order of the measured processing time; and
change the priority for each of the plurality of pipeline stages by hooking an application programmable interface of a driver that controls an operation of the processor.

2. The arithmetic processing device according to claim 1, wherein a measurement of the processing time and a setting of the priority are performed before an execution of the plurality of data processes.

3. The arithmetic processing device according to claim 1, wherein the processor hooks a function which generates a queue with no priority by the application programmable interface of the driver and a function which generates a queue with a priority by the application programmable interface of the driver.

4. An arithmetic processing method comprising:
executing, by a processor, a plurality of data processes each of which is divided into a plurality of pipeline stages in parallel at different timings;
measuring a processing time of each of the plurality of pipeline stages;
setting a priority of the plurality of pipeline stages in a descending order of the measured processing time; and
changing the priority for each of the plurality of pipeline stages by hooking an application programmable interface of a driver that controls an operation of the processor.

5. The arithmetic processing method according to claim 4, wherein a measurement of the processing time and a setting of the priority are performed before an execution of the plurality of data processes.

6. The arithmetic processing method according to claim 4, wherein a function which generates a queue with no priority by the application programmable interface of the driver and a function which generates a queue with a priority by the application programmable interface of the driver are hooked.

* * * * *